US012779763B2

(12) United States Patent
Kannengiesser et al.

(10) Patent No.: US 12,779,763 B2
(45) Date of Patent: Nov. 3, 2026

(54) METHOD FOR HEATING A PREFORM AND CORRESPONDING METHOD FOR FORMING A CONTAINER

(71) Applicant: SOCIETE DES PRODUITS NESTLE S.A., Vevey (CH)

(72) Inventors: Damien Jean-Philippe Kannengiesser, Golbey (FR); Laurent Henriquel, Epinal (FR)

(73) Assignee: Societe des Produits Nestle S.A., Vevey (CH)

( * ) Notice: Subject to any disclaimer, the term of this patent is extended or adjusted under 35 U.S.C. 154(b) by 58 days.

(21) Appl. No.: 18/007,357

(22) PCT Filed: Jul. 30, 2021

(86) PCT No.: PCT/EP2021/071382
§ 371 (c)(1),
(2) Date: Jan. 30, 2023

(87) PCT Pub. No.: WO2022/029023
PCT Pub. Date: Feb. 10, 2022

(65) Prior Publication Data

US 2023/0271373 A1 Aug. 31, 2023

(30) Foreign Application Priority Data

Aug. 3, 2020 (EP) .................................... 20189148

(51) Int. Cl.
*B29C 49/64* (2006.01)
*B29C 49/42* (2006.01)
(Continued)

(52) U.S. Cl.
CPC .... *B29C 49/6458* (2022.05); *B29C 49/42119* (2022.05); *B29C 49/685* (2022.05);
(Continued)

(58) Field of Classification Search
CPC ..... B29C 49/64; B29C 49/42; B29C 49/6458; B29C 49/42119; B29C 2949/0715; B29L 2031/7158; B29B 11/08
See application file for complete search history.

(56) References Cited

U.S. PATENT DOCUMENTS

2010/0127435 A1* 5/2010 Feuilloley ........... B29C 49/6436 264/492
2011/0006462 A1 1/2011 Cochran et al.
2012/0074619 A1 3/2012 Burns et al.

FOREIGN PATENT DOCUMENTS

CN 209336066 U 9/2019
DE 102005061334 6/2007
(Continued)

OTHER PUBLICATIONS

1 Chinese Office Action for Appl No. 202180058324.9 dated Sep. 11, 2025, 7 pages.

*Primary Examiner* — Alison L Hindenlang
*Assistant Examiner* — Shibin Liang
(74) *Attorney, Agent, or Firm* — K&L Gates LLP

(57) ABSTRACT

A method for heating a preform (1) comprising a body portion (4) having a thickness which varies progressively along any transverse cross-section between a thick zone and a thin zone of the body portion. The method comprises the following steps: —introducing the preform (1) into a heating apparatus (5) comprising an array of infrared emitters (50) arranged in multiple columns (Cj) and multiple rows (Ri); —setting power levels of the infrared emitters (50) so as to divide the array of infrared emitters into subsets C of columns (SCn); and—heating the preform while translating it in a direction parallel to the rows (Ri), and simultaneously rotating said preform (1) around its longitudinal axis, the rotation and translation speeds, and the power levels of the infrared emitters (50) being set so that the greater the
(Continued)

thickness of the zones of the body portion (4), the higher is the power level of the subsets of columns (SCn) facing said zones.

5 Claims, 9 Drawing Sheets

(51) Int. Cl.
*B29C 49/68* (2006.01)
*B29L 31/00* (2006.01)

(52) U.S. Cl.
CPC ................ *B29C 2949/0715* (2022.05); *B29L 2031/7158* (2013.01)

(56) References Cited

FOREIGN PATENT DOCUMENTS

| | | | | |
|---|---|---|---|---|
| DE | 102015102722 | | 8/2016 | |
| WO | 2017/020116 | * | 2/2017 | ............ B29B 11/08 |

* cited by examiner

Fig. 8A
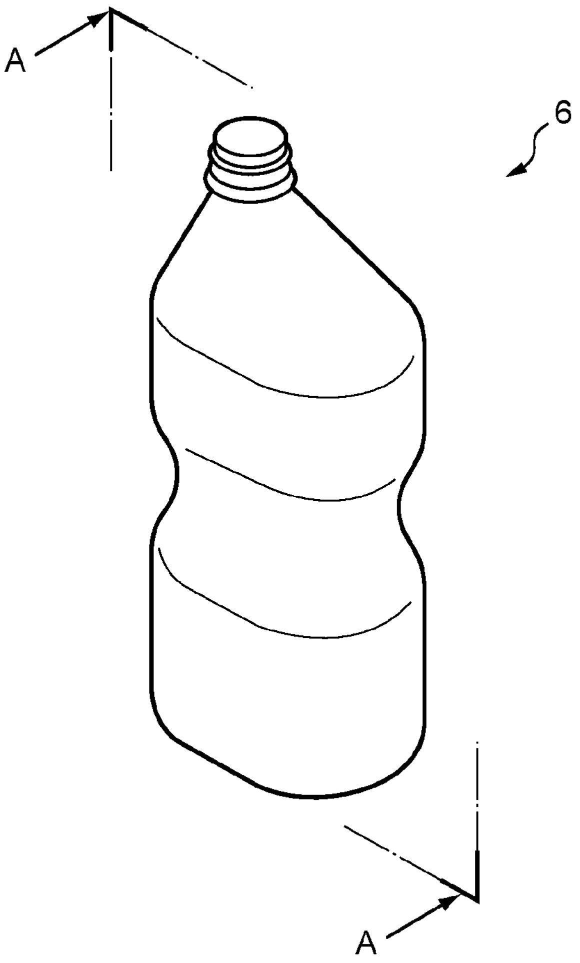
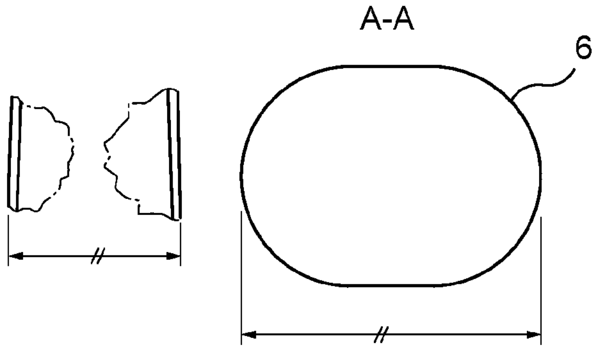
Fig. 8B

METHOD FOR HEATING A PREFORM AND CORRESPONDING METHOD FOR FORMING A CONTAINER

CROSS REFERENCE TO RELATED APPLICATIONS

The present application is a National Stage of International Application No. PCT/EP2021/071382, filed on Jul. 30, 2021, which claims priority to European Patent Application No. 20189148.8, filed on Aug. 3, 2020, the entire contents of which are being incorporated herein by reference.

FIELD OF THE INVENTION

The present invention concerns a method for heating a preform and method for forming a container.

BACKGROUND OF THE INVENTION

The bottles, used to store a product such a liquid, that are commercially available are mainly manufactured starting from a preform to which a desired shape is given. The preform is a hollow element, generally having the shape of a test tube and made of a thermoplastic resin such as PET Polyethylene terephthalate.

The bottles are usually manufactured by using a method comprising the following steps: injection, heating and stretch blow-moulding of a preform.

The first step of injection consists of injecting the thermoplastic resin in a mould such as to create the preform. Then, in the second step, the preform is heated at a temperature below their recrystallization point. Finally, in a third step, the bottle is created by blow-moulding the preform.

In most state of the art, the heating step is carried out using a heating apparatus comprising halogen lamps, as represented at FIG. 1*a*. The preform passes in front of the halogen lamps to be heated prior to be blown.

While this solution for heating can be satisfactory to manufacture bottles having a neck with a median axis coincident with a median longitudinal axis of the bottle, it presents drawbacks when it comes to manufacture a bottle with a median axis being offset from the median longitudinal axis of the bottle (named hereafter offset bottles). Offsetting the neck of a bottle provides an easier pouring of the product contained in the bottle. This can also be advantageous for aesthetic or branding purposes.

In order to form such a bottle with an offset neck, a particular preform, such as the one described in WO 2017 020 116 A1, can be used. Said preform comprises a neck portion, a base portion, and a body portion extending between the neck portion and the base portion. The body portion is defined between a circular inner surface and a circular outer surface defined along laterally offset axis along substantially the entire length of the body portion, such that a wall thickness varies circumferentially around the preform.

The heating solutions known in the state of art, and in particular the halogen lamps, do not enable the manufacture of a bottle with an offset neck having a homogeneous thickness starting from such a preform with a body portion presenting an uneven thickness. This is illustrated in FIG. 1*b* in which an offset bottle obtained by the heating methods and manufacturing of prior art is depicted. FIG. 1*c* shows in a transverse cross-section of FIG. 1*b*, the uneven thickness of the bottle.

SUMMARY OF THE INVENTION

The invention concerns a method for heating a preform comprising an open neck portion at a first end, a closed base portion at a second end, and a body portion extending along a longitudinal axis between the neck portion and the base portion, said body portion having a thickness which varies progressively along any transverse cross-section between a thick zone and a thin zone of the body portion and defining therebetween zones of the body portion having different thicknesses.

According to the invention, the method comprises the following steps:

- introducing the preform into a heating apparatus comprising an array of infrared emitters arranged in multiple columns and multiple rows, the preform and said array being disposed such that the longitudinal axis and the columns of the array of infrared emitters are parallel or directed obliquely with respect to each other;
- orienting angularly the preform at an input angular position by rotating the preform around the longitudinal axis;
- setting power levels of the infrared emitters so as to divide the array of infrared emitters into subsets of columns, each subset of columns generating heat at a different power level from an adjacent subset of columns; and
- heating the preform with the array of infrared emitters while translating the preform in a direction parallel to the rows of the array at a translation speed, and simultaneously rotating said preform around its longitudinal axis in front of said infrared emitters at a rotation speed, the rotation speed, the translation speed, the input angular position and the power levels of the infrared emitters being set so that the greater the thickness of the zones of the body portion, the higher is the power level of the subsets of columns facing said zones of the body portion.

Thanks to the layout of the infrared emitters in array with columns and rows, the preform can be heated at different power levels from one zone of the body portion to another. In particular, the zones of the body portion where the thickness is high can be heated at higher power levels than the zones of the body portion where the thickness is small.

By being able to control the power level of each infrared emitter, and setting accordingly the rotation speed, the input angular position, the translation speed and the power levels of the infrared emitters, it is thus possible starting from a preform with a body portion having an uneven thickness, to obtain the desired gradient of temperature in the preform.

This method for heating provides the appropriate heating to said preform which will be further blow-moulded to manufacture a bottle with a offset neck. Thanks to this method, it is possible to manufacture an offset bottle with a homogeneous thickness.

It shall be understood that a homogeneous thickness stands for a constant thickness or a substantially constant thickness, i.e. the variation in a transversal cross-section from one zone to another of the bottle does not exceed 20%.

In one embodiment, the number of columns for each subset of columns is determined according to the dimension of the emitters in the direction of the preform translation, the perimeter of the transverse cross-section of the body portion, the translation speed and the rotation speed.

It is thus possible to set these parameters to obtain the appropriate and desired heating of the preform. For example, the parameters can be set such that each point of the preform faces infrared emitters at the same power levels all along its trajectory in the heating apparatus.

In one embodiment, when setting the power levels of the heat generated by the infrared emitters, the array of infrared emitters is divided into sub-arrays, the subsets of columns of each sub-arrays generating heat at decreasing power levels from one end subset of columns to an opposite end subset of columns.

This setting of the power levels of the infrared emitters enables for instance an appropriate heating for a preform of which the body portion has a thickness that gradually decreases from a thicker zone to a thinner zone.

In one embodiment, the method for heating is implemented for a preform of which the body portion of said preform comprises an outer surface and an inner surface having longitudinal axis which are offset with respect to one another, wherein when setting the power levels of the heat generated by the infrared emitters, the array of infrared emitters is divided into sub-arrays, each sub-array comprising two end subsets of columns and one inner subset of columns, the subset of columns of each sub-array being configured to generate heat at decreasing power levels from each end subset of columns to the inner subset of columns.

This setting of the power levels of the infrared emitters thus enables an appropriate heating for a preform of which the body portion has a thickness that gradually decreases from a thicker zone to a thinner zone symmetrically according to a longitudinal plane.

In one embodiment, the power levels of the infrared emitters of all the sub-arrays are set similarly.

Thanks to this setting, each point of the preform faces subsets of columns generating heat at the same power levels all along its trajectory in the heating apparatus.

In a second aspect, the invention concerns a heating apparatus configured to implement the method for heating. The heating apparatus comprises:

- an array of infrared emitters arranged in multiple columns and multiple rows; and
- means for holding, orienting the preform at said input angular position, translating along a direction parallel to the rows at an settable translation speed and simultaneously rotating said preform around its longitudinal axis in front of said infrared emitters at an settable rotation speed.

In a third aspect, the invention concerns a method for manufacturing a container, in particular, a bottle using a preform comprising an open neck portion at a first end, a closed base portion at a second end, and a body portion extending along a longitudinal axis between the neck portion and the base portion, said body portion having a thickness which varies progressively along any transverse cross-section between a thick zone and a thin zone of the body portion and defining therebetween zones of the body portion having different thicknesses.

The method for manufacturing comprises the following steps:

- heating the preform using the method for heating;
- transferring the preform into a container-shaped mould and orienting the preform in said mould such that the greater the thickness of the body portion, the greater is the distance from said zone to an inner wall of the mould; and
- blow-moulding the heated preform in the blow-moulding container-shaped mould, by injecting air so as to make the heated preform stretch and take the shape of the mould.

This method provides a bottle having a neck which is offset with respect to the rest of the bottle, and presenting a homogeneous thickness.

In a fourth aspect, the invention concerns a bottle manufactured by said method for manufacturing.

BRIEF DESCRIPTION OF THE DRAWINGS

Additional features and advantages of the present invention are described in, and will be apparent from, the description of the presently preferred embodiments which are set out below with reference to the drawings in which:

FIGS. 8*a*, 8*b* and 8*c* represent an offset bottle manufactured using the method and the apparatus for heating according to one embodiment.

DETAILED DESCRIPTION OF THE INVENTION

Figure 2A:
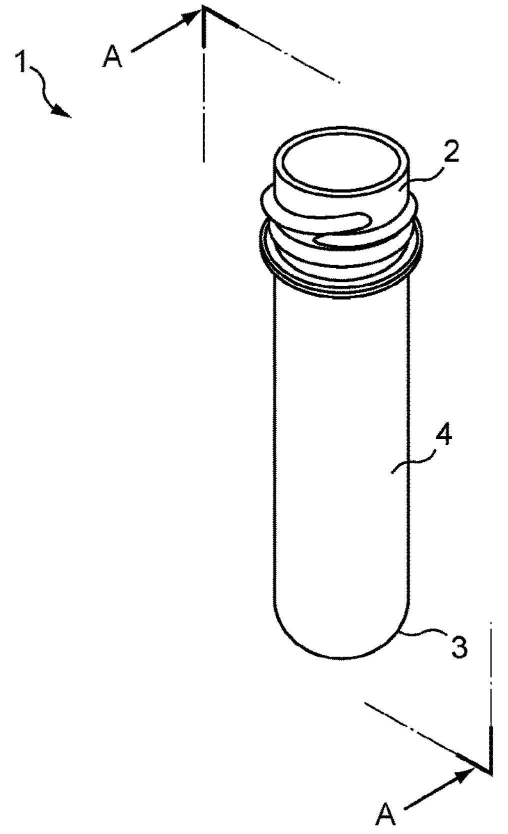
FIGS. 2*a*, 2*b*, 2*c*, 2*d*, 2*e* represent an example of a preform used to obtain an offset bottle.

FIG. 2*a* represents an example of a preform 1 used to manufacture an offset bottle. The preform 1 comprises a neck portion 2, a base portion 3 and a body portion 4. The body portion 4 extends between the neck portion 2 and the base portion 3, along a longitudinal axis A1. The preform 1 presents the shape of a test tube. The preform 1 has an inner surface 10 and an outer surface 11 (visible on FIG. 2*b*).

The neck portion 2 extends at an open first end 12 of the preform 1. The neck portion 2 has a substantially tubular shape.

The neck portion 2 comprises a threaded part 20. Once the bottle manufactured starting from the preform 1, the threaded part 20 is intended to cooperate with a threaded top able to close the bottle.

The base portion extends at a closed second end 13 of the preform 1. The base portion 3 has a substantially hemispherical shape. The base portion can present a different shape, such as a substantially conical shape, in other embodiments.

The body portion 4 comprises a wall having an inner surface 40 and an outer surface 41. The body portion 4 has here a tubular shape. The inner surface 40 and the outer surface 41 have thus a substantially circular cross-section.

Figure 2B:
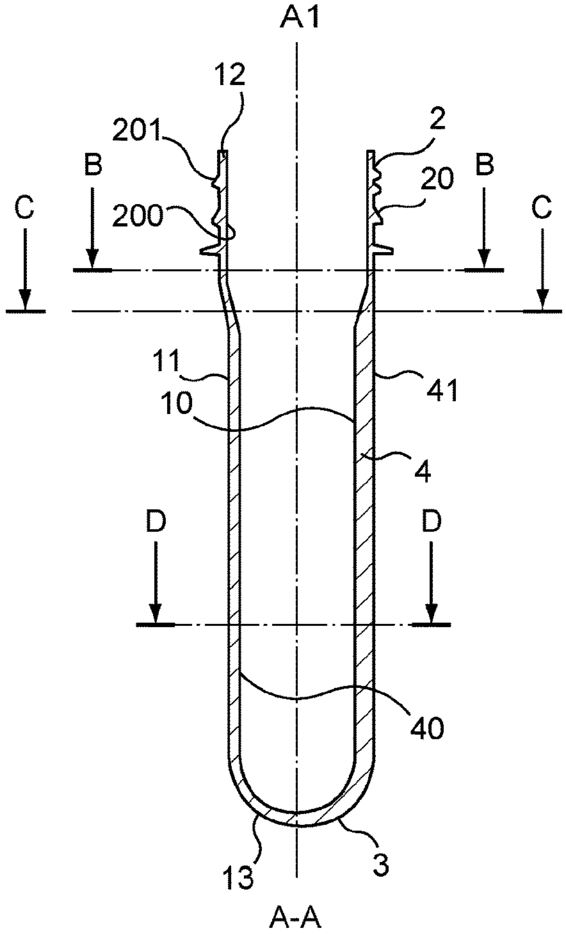
Figure 2C:
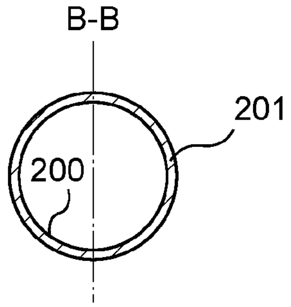
Figure 2D:
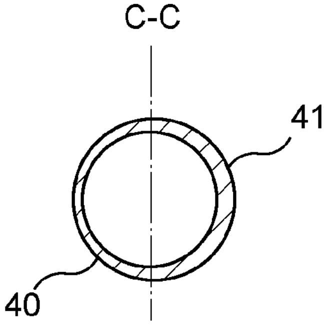
Figure 2E:
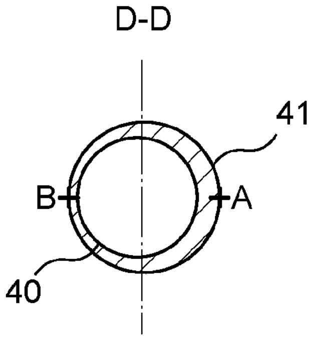
Figure 3A:
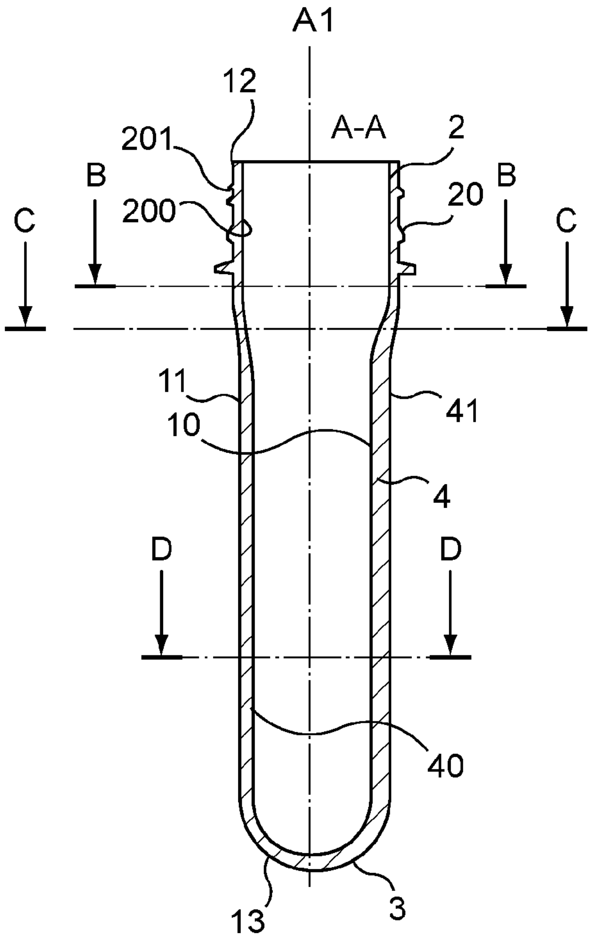
FIGS. 3*a*, 3*b*, 3*c*, 3*d* represent another example of a preform used to obtain an offset bottle.
Figure 3B:
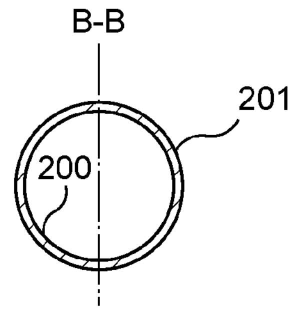
Figure 3C:
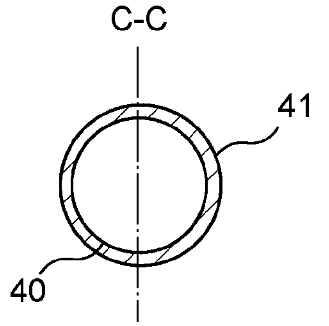
Figure 3D:
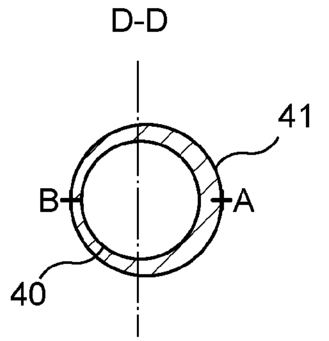

FIG. 2*b* represents a longitudinal cross-section view taken along lines A-A of FIG. 2*a*. FIGS. 2*c*, 2*d*, 2*e* represent transverse cross-section views taken respectively along lines B-B, C-C and D-D of FIG. 2*b*.

In particular, FIG. 2*c* represents the transverse cross-section of the neck portion 2 at the junction with the body portion 4. As can be seen on FIGS. 2*b* and 2*c*, the threaded part 20 of the neck portion 2 has a homogeneous thickness. In other words, the dimension taken between an inner surface 200 and an outer surface 201 of the threaded part 20 is constant across the entire transverse cross-section.

FIGS. 2*d*, 2*e* represent the transverse cross-section of the body portion 4 on two different planes. The body portion 4 has an uneven thickness along any transverse. The body portion 4 has a thickness which varies progressively along any transverse cross-section between a thick zone and a thin zone of the body portion and defines therebetween zones of the body portion having different thicknesses. In other words, the thickness of the body portion 4 along any transverse cross-section varies continuously from a first zone, namely a thick zone, towards a second zone thinner than the thick zone, namely a thin zone.

In the particular illustrated example, the inner surface 40 and the outer surface 41 of the body portion 4 have longitudinal axis which are offset with respect to one another. The thickness of the body portion 4 thus varies symmetrically with respect to a longitudinal plane. The thickness of the body portion 4 varies similarly along any transverse cross-section. Of course, in another embodiment, the thickness of the body portion can vary differently from a transverse cross-section to another.

In the illustrated embodiment, the base portion 3 also presents the same thickness variation as the body portion 4, as can be seen in FIG. 2*b*.

FIGS. 3*a*-3*d* represent an embodiment close to that of FIGS. 2*a*-2*e*. The difference resides in that in FIGS. 3*a*-3*d*, the outer surface 11 of the preform 1 is a surface of revolution, whilst it is not in the embodiment of FIGS. 2*a*-2*e*. In the embodiment of FIGS. 2*a*-2*e*, it is the inner surface 10 of the preform 1 which is a surface of revolution.

Figure 4:
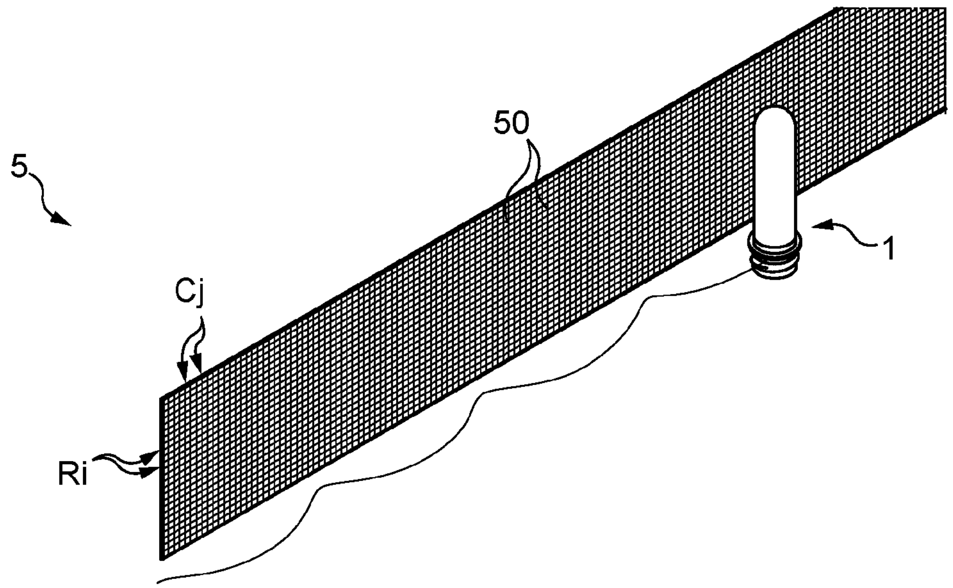
FIG. 4 represents a heating apparatus according to an embodiment of the invention and in which a preform is heated.

FIG. 4 represents a heating apparatus 5 according to an embodiment of the invention and in which a preform is heated.

The heating apparatus 5 comprises several infrared emitters 50 arranged in a matrix layout. In other words, the heating apparatus comprises an array of infrared emitters 50 arranged in multiple rows Ri and multiple columns Cj, with i and j a whole number at least equal to one.

Each infrared emitter 50 can emit heat at a settable power level. The heating apparatus thus comprises setting means (not represented) which enable setting the power levels of the heat emitted by each infrared emitter 50.

The heating apparatus 5 further comprises means for holding, translating along a direction parallel to the rows Ri at a settable translation speed, and simultaneously rotating the preform 1 around its longitudinal axis A1 in front of the infrared emitters 50 at a settable rotation speed. These means are not represented either.

An example of the trajectory of a point of the outer surface 11 of the preform 1 is illustrated. Of course, as will be understood along with the description of the method for heating the preform 1, this trajectory varies according to the dimensions of the preform 1 and in particular the diameter of the outer surface 11, the translation speed and the rotation speed.

Thanks to the matrix layout of the infrared emitters 50, the preform 1 can pass in front of several infrared emitters 50 while making a single revolution. This makes possible the use of different power levels from one column Cj to another. Therefore, this enables creating a gradient of temperature on the circumference of the preform 1.

Figure 5:
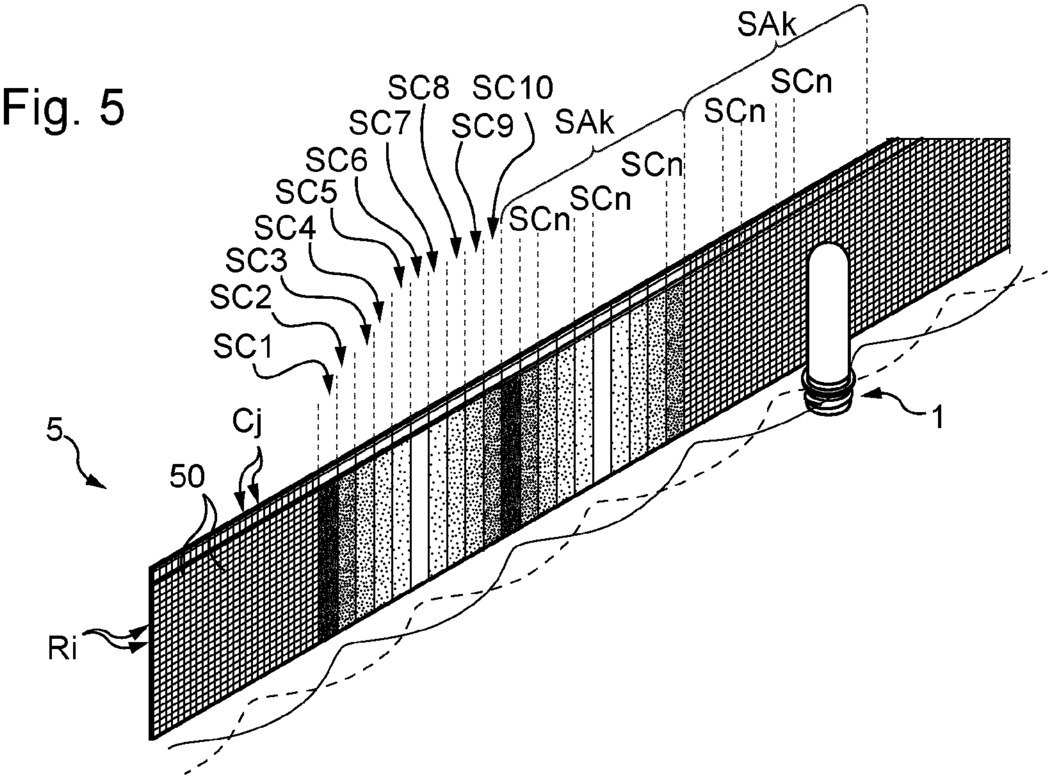
FIG. 5 the heating apparatus of FIG. 4 implementing a method for heating the preform according to an embodiment of the invention.

FIG. 5 represents the heating apparatus 5 of FIG. 4 implementing the method for heating the preform 1 according to an embodiment of the invention.

The power levels of the infrared emitters 50 are set such that to divide the array of infrared emitters into subsets of columns SCn (n being a whole number at least equal to one). Each subset of columns SCn generates heat at a different power level from an adjacent subset of columns. A subset of columns SCn can comprise one or several columns Cj. The number of columns Cj for each subset of columns SCn is determined according to the perimeter of the transverse cross-section of the body portion 4, the thickness variation of the body portion 4, the translation speed, the rotation speed of the preform 1 and the dimension of the emitters 50 in the direction of the preform translation. Preferably, the subset of columns SCn comprises between one and ten columns.

In the illustrated embodiment, when setting the power levels of the heat generated by the infrared emitters 50, the array of infrared emitters 50 is divided into sub-arrays SAk (k being a whole number at least equal to one). All the sub-arrays SAk comprise for example the same number of columns Cj and rows Ri of infrared emitters 50.

Each sub-array SAk comprises here ten subset of columns, each subset of columns comprising three columns. The subset of columns are thus referenced SCn with n varying here from 1 to 10.

Each sub-array SAk comprises two end subsets of columns SC1 and SC10 and one inner subset of columns SC6. The subsets of columns SCn of each sub-array SAk are configured to generate heat at decreasing power levels from each end subset of columns SC1, SC10 to the inner subset of columns SC6. In this example, the end subset of column SC1 generates heat at the highest power level and the inner subset of columns SC6 generates heat at the lowest power level. The subsets of columns SC2 to SC5 and the subsets of columns SC7 to SC10 generate power in a symmetric manner with respect to the inner subset of columns SC6. In other words, the two subsets of columns of the following pairs generate the same power level of heat: (SC2; SC10), (SC3; SC9), (SC4; SC8), (SC5; SC7).

Of course, the use of the wording "decreasing from" is relative to the considered subset of columns. For instance, in the represented embodiment, the subsets of columns SCn of each sub-array SAk are configured to generate heat at increasing power levels from the inner subset of columns SC6 to respectively each end subset of columns SC1, SC10. Moreover, the subdivision made into subsets of columns in this embodiment should not be understood limitatively. Each sub-array SAk can comprise a different number of subsets of columns SCn in a different setting of power levels.

In this figure, two sub-arrays SAk are represented differently than the rest of the sub-arrays SAk. In particular, the subset of columns SCn of each of said two sub-arrays SAk are distinguished from one another by different densities of point clouds. The higher the density of the point clouds of the subset of column SCn, the higher its power level is, and vice versa. The subsets of columns SCn generating heat at the same power level are represented with the same density of point clouds.

For clarity sake of the figure, only said two sub-arrays SAk are represented in this manner. However, one should understand that all the sub-arrays SAk may generate heat in the same fashion.

In this document, a power level of a subset of columns shall be understood as the sum of power levels of all the infrared emitters 50. Two subsets of columns generating the same power level have their respective infrared emitters generating the same power levels. Two subsets of columns generating the same power level are thus similarly set.

In the illustrated embodiment, all the infrared emitters 50 of the same subset of columns SCn generate heat at the same power level. Thus, all the rows Ri of the same subset of columns SCn generate heat at the same power level. Of course, in another embodiment, not only the power levels of the columns but also the power levels of the rows Ri can vary.

The method for heating the preform 1 functions as follows. The preform 1 is introduced into the heating apparatus 5 and oriented prior to enter the heating apparatus 5 for example by a mechanical block or any appropriate device. The preform 1 is oriented towards the holding means of the heating apparatus 5.

The preform 1 and the array of emitters 50 are disposed such that the longitudinal axis A1 and the columns Cj are parallel or directed obliquely with respect to each other. The longitudinal axis A1 of the preform 1 is thus orthogonal to the rows Ri of the array of emitters 50.

Preferably, the preform 1 is introduced and oriented such that the longitudinal axis A1 extends vertically. The array of emitters 50 are either placed also vertically. The array of emitters 50 is either placed vertically or inclined with respect to the vertical direction. In other words, the columns Cj extend either vertically or inclined with respect to the vertical direction.

Therefore, the preform 1 and the array of emitters 50 are disposed with respect to each other such that the distance between the emitters 50 and the outer surface 11 of the preform 1 facing the emitters 50 is substantially constant at any point of said outer surface 11.

The longitudinal axis A1 and the columns Cj form a projection angle between 0° and 45°, and preferably here between 0° and 25°.

In the particular illustrated examples, the longitudinal axis A1 of the preform 1 is parallel to the columns Cj.

The preform 1 is then angularly oriented at an input angular position on the holding means. The preform 1 is angularly oriented such that the thicker zone of the body portion 4 faces the subset of columns having the highest power level.

The preform 1 is heated with the array of infrared emitters 50 while translating the preform 1 along a direction parallel to the rows Ri of the array at a certain translation speed, and simultaneously rotating the preform around its longitudinal axis in front of the infrared emitters at a certain rotation speed.

The means for orienting the preform 1 at the input angular position and rotating it around the longitudinal axis A1 along the preform's trajectory in the heating apparatus can be one same tool or distinct ones.

The rotation speed, the translation speed, the input angular position and the power levels of the infrared emitters are set so that the heat generated by the subsets of columns facing thicker zones of the body portion is higher than the heat generated by the subsets of columns facing thinner zones of the body portion.

In the represented embodiment, the subsets of columns SC1 to SC10 have different power level and face during heating different zones of the body portion 4. As the end subset of columns SC1 generates the heat at the highest power level, the end subset of columns SC1 faces thus the thickest zone of the body portion. The inner subset of columns SC6 generating the heat at the lowest power level, faces the thinnest zone of the body portion.

The cycloids represent the trajectories of two points A, B (represented at FIGS. 2*a*, 3*d*) of the outer surface 41 of the body portion 4. Point A is the point of the outer surface 41 where the thickness is the highest, and point B is the point of the outer surface 41 where the thickness is the lowest in one transverse plane. In other words, point A is the most distance point of the outer surface 41 from the inner surface 40 of the body portion 1. Point B is the nearest point of the outer surface 41 from the inner surface 40 of the body portion 4.

The cycloid in a solid line on FIG. 5 shows that point A faces all along its trajectory in the heating apparatus the subsets of columns SC1, i.e. the subsets of columns generating heat at the highest power level. On the contrary, the cycloid in dotted line shows that point B faces all along its trajectory in the heating apparatus the subsets of columns SC6, i.e. the subsets of columns generating heat at the lowest power level. The preform 1 is thus being heated in front of the infrared emitters 50 while making only one revolution from one sub-array SAk to another.

Figure 6:
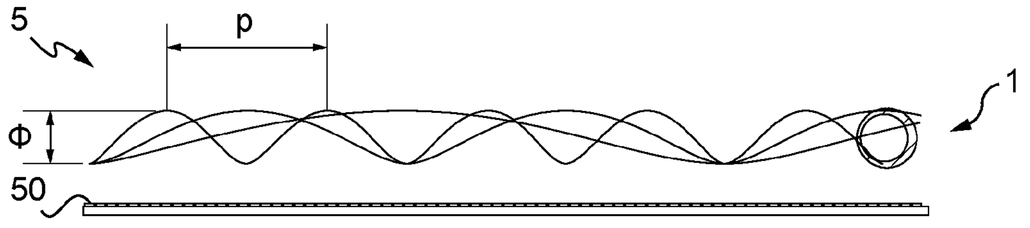
FIG. 6 represents the heating apparatus of FIG. 4 along a cross-section plane.

FIG. 6 is a cross-section of the heating apparatus 5 of FIG. 5 in a plane parallel to the plane in which the preform moves. Three different cycloids are represented. The amplitude c of the cycloids corresponds to the outer diameter of the body portion 4, i.e. the diameter of the outer surface 41 of the body portion 4. The period p of the cycloids is determined according to the rotation speed and the translation speed of the preform 1.

Of course, the power levels of the subsets of columns can be set in a different manner depending on the thickness variation of the body portion 4. The power levels of the subsets of columns are set in this manner, i.e. gradually decreasing from an end subset of columns to an inner subset of columns, because it is advantageous for the preform having the thickness of the body portion which varies symmetrically with respect to a longitudinal plane. The power levels of the subsets of columns, in particular the subsets of columns SC2 to SC5 and SC7 to SC10 with respect to SC6, are indeed also symmetrically set.

Moreover, the illustrated example of division into multiple sub-arrays SAk is not limitative and is determined depending on the thickness variation of the body portion, the perimeter of the transverse cross-section of the body portion 4, the translation speed and the rotation speed.

For example, the subsets of columns SCn of each sub-array SAk can generate heat at decreasing power levels from one end subset of columns to an opposite end subset of columns.

Figure 7:
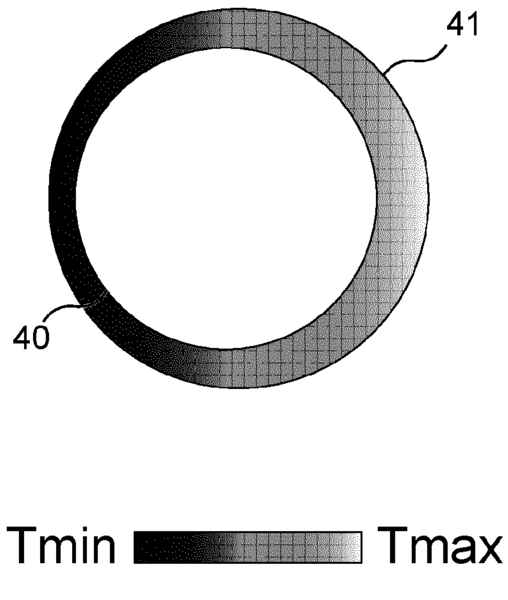
FIG. 7 represents an example of heating profile obtained in a transverse cross-section of the preform by heating the preform using the method for heating according to the invention.

FIG. 7 represents an example of heating profile obtained in a transverse cross-section of the body portion 4 by heating the preform 1 using the method for heating according to the example represented at FIG. 5. Shades of grey are used to represent the temperature of the body portion 4 varying from thinner zones to thicker zones.

In this document, a thickness ratio is defined as being the ratio between the maximal thickness and the minimal thickness of the body portion 4. And a temperature variation as the difference between the maximal temperature and the minimum temperature along the transverse cross-section of the body portion 4.

It has been determined that when the thickness ratio is about 2, the temperature variation is comprised between 5° C. and 15° C. when the thickness ratio is about 3, the temperature variation is comprised between 15° C. and 25° C.

Figure 8C:
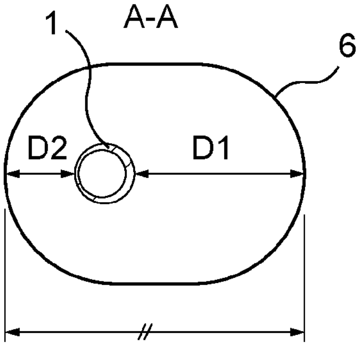
Figure 9:
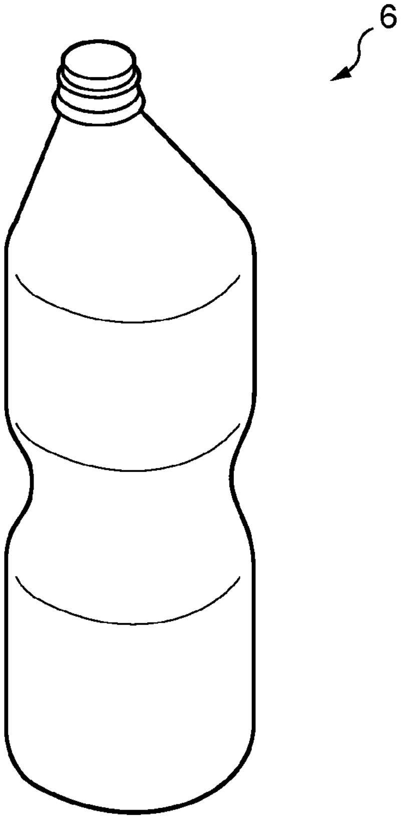
FIG. 9 represent an offset bottle using the method and the apparatus for heating according to another embodiment manufactured.

FIGS. 8*a* and 9 represent bottles 6 according to two embodiments manufactured using the method and the apparatus for heating. The bottles 6 are offset bottles, i.e. their respective neck has a median axis which is offset from a median longitudinal axis of the bottle 6.

When manufacturing a bottle 6, and in particular during the blow-moulding process, the neck portion 2 does not undergo any transformation. Generally, only the body portion 4 and the base portion 3 are modified so that the preform 1 takes a bottle-shape or any container-shape.

Figure 1A:
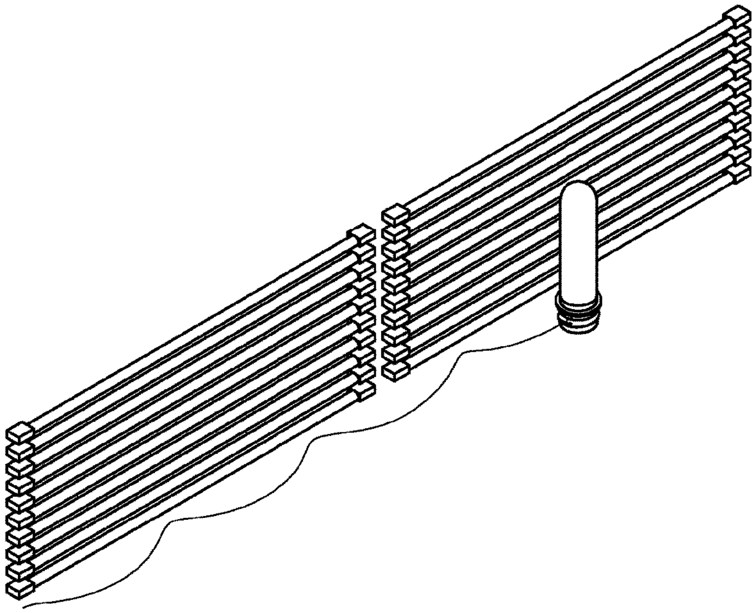
Fig. 1A Prior art
FIG. 1*a* represents a heating apparatus of the prior art in which a preform is heated.
Figure 1B:
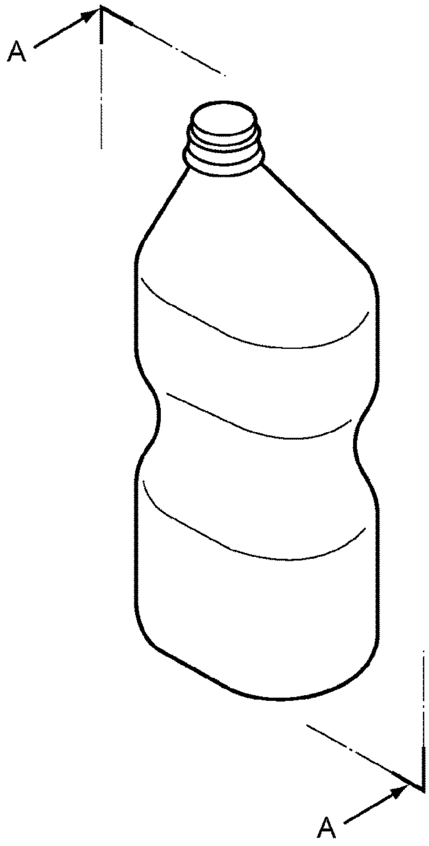
Fig. 1B Prior art
FIGS. 1*b* and 1*c* represents an offset bottle manufactured using prior art methods and apparatuses.
Figure 1C:
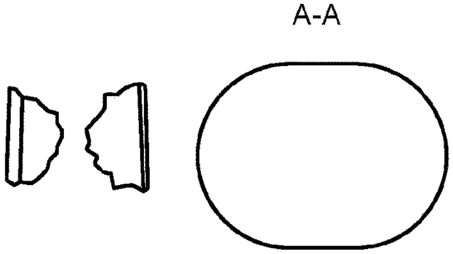
Fig. 1C Prior art

A transverse cross-section of FIG. 8*a* as well as the homogeneous thickness of the bottle are for instance depicted in FIG. 8*b*. Thanks to the heating method implemented in the heating apparatus 5 according to the invention, the offset bottles 6 present a homogenous thickness compared to the uneven thickness obtained for offset bottles of prior art (as shown in FIG. 1*c*). On FIG. 8*c*, a transverse cross section of the body portion 4 is also illustrated with the bottle of FIG. 8*a*, to show that during blow-moulding in a container-shaped mould, for example a bottle-shaped mould, the preform 1 is oriented at a certain angular position. In particular, the preform is oriented in the mould such that the highest is the thickness of a zone of the body portion 4, the longer the distance from said zone to an inner wall of the mould.

In the represented example, a thick zone of the body portion 4 has a longer distance D1 to cross until the inner wall of the mould than a thinner zone of the body portion 4 which has a smaller distance D2 to cross. There is thus a greater stretching at the zones having a higher thickness than in the rest of the body portion 4.

The invention thus proposes a solution for manufacturing an offset bottle having a homogeneous thickness starting from a preform with a body portion having an uneven thickness.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A method for heating a preform comprising an open neck portion at a first end, a closed base portion at a second end, and a body portion extending along a longitudinal axis between the neck portion and the base portion, said body portion having a thickness which varies progressively along any transverse cross-section between a thick zone and a thin zone of the body portion and defining therebetween zones of the body portion having different thicknesses, wherein a thickness ratio of the body portion being the ratio between a maximal thickness and a minimal thickness of the body portion is between about 2 and about 3, and a temperature variation between a maximal temperature and a minimal temperature is between 5° C. to about 30° C., said method comprising the following steps:

introducing the preform into a heating apparatus comprising an array of infrared emitters arranged in multiple columns and multiple rows, the preform and said array being disposed such that the longitudinal axis and the columns of the array of infrared emitters are parallel or directed obliquely with respect to each other;

orienting angularly the preform at an input angular position by rotating the preform around the longitudinal axis; setting power levels of the infrared emitters so as to divide the array of infrared emitters into subsets of columns, each subset of columns generating heat at a different power level from an adjacent subset of columns; and heating the preform with the array of infrared emitters while translating the preform in a direction parallel to the rows of the array at a translation speed, and simultaneously rotating said preform around the longitudinal axis in front of said infrared emitters at a rotation speed, wherein the translating and the rotating comprises moving the preform along a trajectory, wherein the preform includes a first point on an outer surface where the thickness is highest and a second point on the outer surface where the thickness is lowest, wherein the trajectory is selected from the group of:

a first trajectory, wherein the first point faces a subset of columns generating heat at the highest power level as the preform moves along the first trajectory; and a second trajectory, wherein the second point faces a subset of columns generating heat at the lowest power level as the preform moves along the second trajectory, and the rotation speed, the translation speed, the input angular position and the power levels of the infrared emitters being set so that the greater the thickness of the zones of the body portion, the higher is the power level of the subsets of columns facing said zones of the body portion.

2. The method for heating according to claim 1, wherein the number of columns for each subset of columns is determined according to the dimension of the emitters in the direction of the preform translation, the perimeter of the transverse cross-section of the body portion, the translation speed and the rotation speed.

3. The method for heating according to claim 1, wherein when setting the power levels of the heat generated by the infrared emitters, the array of infrared emitters is divided into sub-arrays, the subsets of columns of each sub-arrays generating heat at decreasing power levels from one end subset of columns to an opposite end subset of columns.

4. The method for heating according to claim 3, wherein the power levels of the infrared emitters of all the sub-arrays are set similarly.

5. The method for heating a preform according to claim 1, the body portion of said preform comprising an outer surface and an inner surface having longitudinal axis which are offset with respect to one another, wherein when setting the power levels of the heat generated by the infrared emitters, the array of infrared emitters is divided into sub-arrays, each sub-array comprising two end subsets of columns and one inner subset of columns, the subset of columns of each sub-array being configured to generate heat at decreasing power levels from each end subset of columns to the inner subset of columns.

* * * * *